(12) United States Patent
Nuthakki et al.

(10) Patent No.: US 11,768,744 B2
(45) Date of Patent: Sep. 26, 2023

(54) ALERTING AND MANAGING DATA STORAGE SYSTEM PORT OVERLOAD DUE TO HOST PATH FAILURES

(71) Applicant: EMC IP Holding Company LLC, Hopkinton, MA (US)

(72) Inventors: Krishna Deepak Nuthakki, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 173 days.

(21) Appl. No.: 17/159,329

(22) Filed: Jan. 27, 2021

(65) Prior Publication Data

US 2022/0237091 A1 Jul. 28, 2022

(51) Int. Cl.
*G06F 11/00* (2006.01)
*G06F 11/20* (2006.01)
*G06F 3/06* (2006.01)

(52) U.S. Cl.
CPC .......... *G06F 11/201* (2013.01); *G06F 3/0611* (2013.01); *G06F 3/0659* (2013.01); *G06F 3/0673* (2013.01); *G06F 2201/85* (2013.01)

(58) Field of Classification Search
CPC ........................... G06F 11/201; G06F 2201/85
USPC ....................................................... 714/1–57
See application file for complete search history.

(56) References Cited

U.S. PATENT DOCUMENTS

| | | | |
|---|---|---|---|
| 6,590,875 B1 * | 7/2003 | Niwa | H04B 1/745 370/332 |
| 7,949,637 B1 | 5/2011 | Burke | |
| 9,152,349 B2 | 10/2015 | Yochai | |
| 10,852,980 B1 | 12/2020 | Specht et al. | |
| 2003/0188218 A1 * | 10/2003 | Lubbers | G06F 11/2079 714/5.11 |
| 2005/0240681 A1 * | 10/2005 | Fujiwara | H04L 67/1095 710/1 |
| 2009/0031057 A1 * | 1/2009 | Ghosalkar | G06F 3/0635 710/38 |

(Continued)

OTHER PUBLICATIONS

Zhe Yang, et al., "Automated Network Configuration Changes for I/O Load Redistribution," U.S. Appl. No. 16/743,125, filed Jan. 15, 2020.

*Primary Examiner* — Sarai E Butler

(74) *Attorney, Agent, or Firm* — Muirhead and Saturnelli, LLC

(57) ABSTRACT

Techniques for detecting and managing target port overloads due to host initiator or path failures may include: receiving I/Os from initiators of a host at target ports of a data storage system; determining initiator workloads for the initiators; determining target workloads for the target ports; determining that a first of the initiators of the host is a failed initiator that has stopped sending I/Os to the data storage system, wherein the first initiator has a first of the initiator workloads; determining, in accordance with the first initiator workload, revised target workloads for the target ports; determining, in accordance with revised target workloads, whether any of the target ports is expected to be overloaded; and responsive to determining that at least one of the target ports is expected to be overloaded, performing a corrective action to alleviate or reduce an overloaded workload condition expected for the at least one target port.

17 Claims, 9 Drawing Sheets

(56) References Cited

U.S. PATENT DOCUMENTS

| | | | |
|---|---|---|---|
| 2009/0234984 A1* | 9/2009 | Chaitanya | H04L 67/1031 710/33 |
| 2011/0276786 A1* | 11/2011 | Eichenberger | G06F 9/30047 711/E12.001 |
| 2012/0173477 A1* | 7/2012 | Coutts | G06F 16/217 707/602 |
| 2013/0227352 A1* | 8/2013 | Kumarasamy | G06F 11/3072 714/47.1 |
| 2014/0056122 A1* | 2/2014 | Singal | H04L 45/28 370/220 |
| 2015/0074463 A1* | 3/2015 | Jacoby | G06F 11/079 714/37 |
| 2015/0095445 A1* | 4/2015 | Thankappan | H04L 67/1097 709/214 |
| 2015/0186411 A1* | 7/2015 | Iliadis | H04L 67/1097 707/637 |

* cited by examiner

| Host Name 202 | Initiators 204 |
|---|---|
| HOST1 | I1, I2 |
| HOST2 | I3, I4, I5 |
| .. | .. |

FIG. 6

ALERTING AND MANAGING DATA STORAGE SYSTEM PORT OVERLOAD DUE TO HOST PATH FAILURES

BACKGROUND

Technical Field

This application generally relates to data storage.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

Various embodiments of the techniques herein may include a method, a system and a computer readable medium for detecting and managing target port overloads comprising: receiving I/Os from a plurality of initiators of a host at a plurality of target ports of a data storage system; determining a plurality of initiator workloads for the plurality of initiators; determining a plurality of target workloads for the plurality of target ports; determining that a first of the plurality initiators of the host is a failed initiator that has stopped sending I/Os to the data storage system, wherein the first initiator has a first initiator workload of the plurality of initiator workloads; determining, in accordance with the first initiator workload, a plurality of revised target workloads for the plurality of target ports; determining, in accordance with plurality of revised target workloads, whether any of the plurality of target ports is expected to be overloaded; and responsive to determining that at least one of the plurality of target ports is expected to be overloaded, performing at least one corrective action to alleviate or reduce an overloaded workload condition expected for the at least one target port.

In at least one embodiment, determining the plurality of revised target workloads for the plurality of target ports may be performed on the data storage system and may include modeling distribution of the first initiator workload over paths from remaining initiators of the host to the plurality of target ports, wherein the remaining initiators include all initiators of the plurality of initiators other than the first initiator that failed. The modeling may be performed on the data storage system in accordance with a load balancing algorithm performed by a multipath driver of the host that performs path selection for selecting a path used for sending I/Os from the host to the data storage system.

In at least one embodiment, processing performed may include receiving, at the data storage system from the host, a plurality of host registration commands, wherein each of the plurality of host registration commands may be sent on a path from one of the plurality of initiators of the host to one of the plurality of target ports of the data storage system. Each of the plurality of host registration commands may include a host name uniquely identifying the host. The data storage system may generate a host registration table using the plurality of host registration commands. The host registration table may identify, for the host, the plurality of initiators of the host. Determining that the first initiator of the host is a failed initiator that has stopped sending I/Os to the data storage system may include determining, using the host registration table, that at least one of the remaining initiators is sending I/Os to the data storage system during a same time that the first initiator has stopped sending I/Os to the data storage system. The host may be a first host having a first entry in the host registration table and the first entry may identify the plurality of initiators as belonging to the first host. Processing performed may include: receiving, at the data storage system from a second host, a second plurality of host registration commands, wherein each of the second plurality of host registration commands is sent on a path from one of a second plurality of initiators of the second host to one of the plurality of target ports of the data storage system, wherein each of the second plurality of host registration commands includes a second host name uniquely identifying the second host; and creating a second entry in the host registration table for the second host, wherein the second entry may identify the second plurality of initiators as belonging to the second host.

In at least one embodiment, the at least one corrective action may include a first corrective action that introduces an additional delay when servicing I/Os sent from the host to the data storage system. It may be determined at a first point in time that the at least one of the plurality of target ports is expected to be overloaded. Subsequent to the first point in time, the host may send a first plurality of I/Os to the data storage system, and wherein the data storage system may wait 1 an additional amount of time before returning an acknowledgement to the host regarding completion of each of the first plurality of I/O operations.

In at least one embodiment, the at least one corrective action may include a first corrective action that allocates additional resources of the data storage system for use by the at least one target port expected to be overloaded. The additional resources may be used by the target port in connection with servicing received I/Os. The additional resources may include any of additional cores, additional threads, or additional processor resources.

In at least one embodiment, the at least one corrective action may include a first corrective action that performs dynamic path state modification that redistributes at least some I/O workload of the at least one target port expected to be overloaded to another one the plurality of target ports that is not expected to be overloaded. A first path may be from one of the remaining initiators to a first of the plurality of target ports expected to be overloaded, and wherein before performing the first correction action, the first path may be preferred. Performing the first corrective action may include: modifying a first state of the first path to denote that the first path has transitioned from preferred to non-preferred; and notifying the host regarding the change in the first state of the first path to non-preferred, wherein the host sends I/Os to the data storage system over one or more other paths having an associated state of preferred and wherein the host does not send I/Os over the first path while the first state is non-preferred unless there are no other active preferred paths between the host and the data storage system.

BRIEF DESCRIPTION OF THE DRAWINGS

Features and advantages of the present invention will become more apparent from the following detailed description of illustrative embodiments thereof taken in conjunction with the accompanying drawings in which:

FIG. 6 is an example of a host registration table that may be used in an embodiment in accordance with the techniques herein.

DETAILED DESCRIPTION OF EMBODIMENTS

A storage system may have a plurality of physically discrete computing modules (hereinafter "computing modules") interconnected by an internal switching fabric of the storage system. For example, a computing module may be a director board of a PowerMax™ data storage system made available from Dell EMC. Each computing module may have its own dedicated local memory and a global memory (GM) segment that is a portion of a distributed GM shared by multiple (e.g., all) computing modules. Each computing module may include one or more central processing units (CPUs). In at least one embodiment, each of the CPUs may be a multi-core CPU including multiple processing cores or processors. The individual cores or processors within a single CPU can execute multiple instruction streams in parallel thereby increasing the performance of software which has been written to take advantage of the unique architecture. In at least one embodiment, one or more of the CPUs may be configured (e.g., hardwired, hardcoded or programmed) as a functional component of a storage system, for example, a front-end adapter (FA), or back-end adapter (BEA) as described in more detail herein, or as some other functional component, for example, an extended data services component (EDS) responsible for one or more data services, e.g., memory management for I/O operations.

Figure 1:
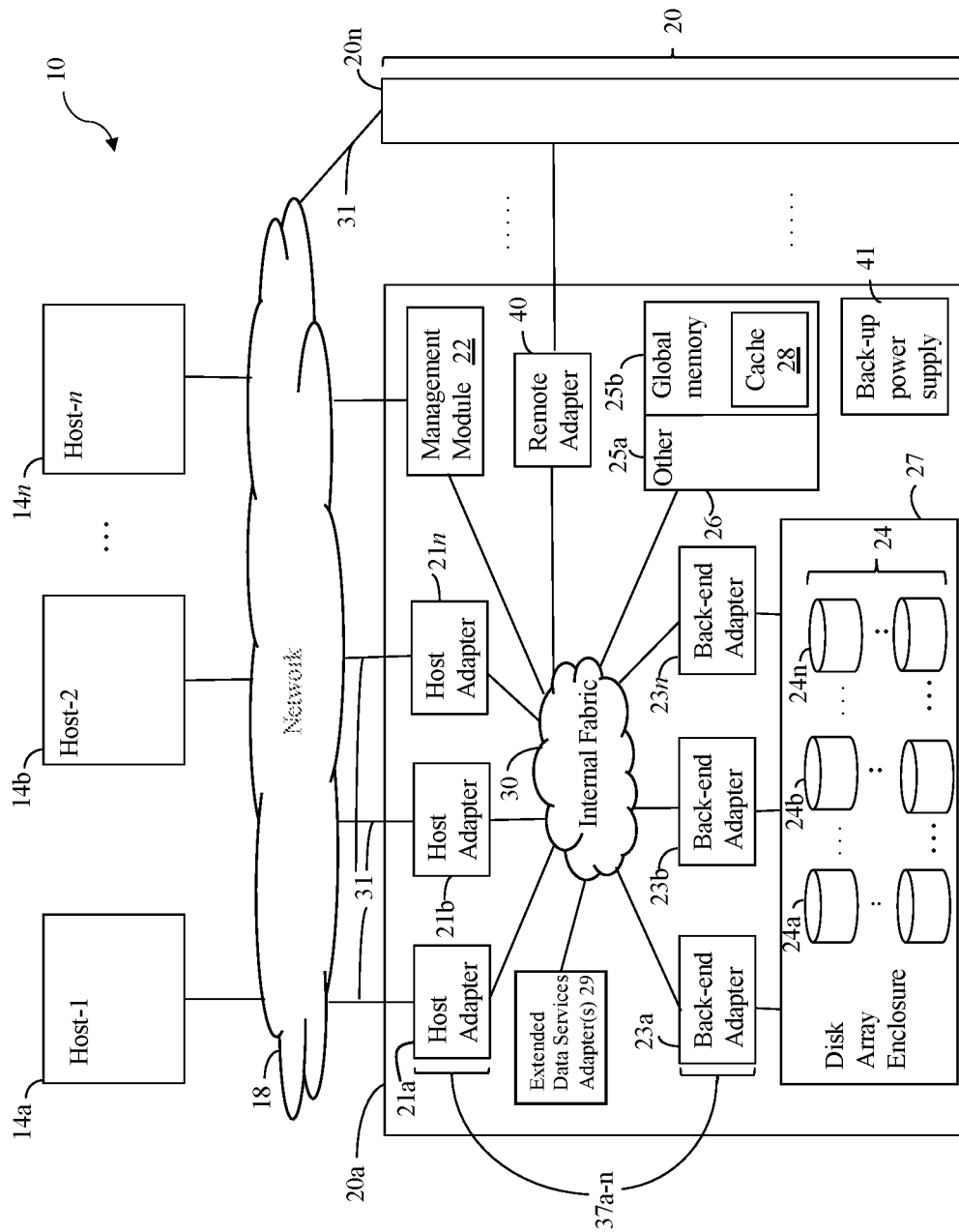
FIGS. 1 and 3 are diagrams illustrating examples of a data storage network in an embodiment in accordance with the techniques herein.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. The storage systems 20a-n, connected to the host systems 14a-n through the network 18, may collectively constitute a distributed storage system 20. All of the host computers 14a-n and the storage systems 20a-n may be located at the same physical site, or, alternatively, two or more host computers 14a-n and/or storage systems 20a-n may be located at different physical locations. The storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to the storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through the network 18. For example, each of the hosts 14a-n may include one or more host bus adapters (HBAs) (not shown) that each include one or more host ports for connecting to the network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe (Non-volatile Memory Express) over Fabric (NVMe-of); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of the network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BEA") (e.g., a director configured to serve as a BEA) responsible for the backend management of operations to and from a portion of the physical storage devices 24. A BEA is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BEA, such as 23a, may be responsible for the management of one or more (e.g., a row) of physical storage devices, such as row 24a. That is, in some configurations, all I/O communications with one or more physical storage devices 24 may be controlled by a specific BEA. The BEAs 23a-n may employ one or more technologies in communicating with, and transferring data to/from, physical storage devices 24, for example, SAS, SATA or NVMe. For NVMe, to enable communication between each BEA and the physical storage devices that it controls, the storage system may include a PCIe switch for each physical storage device controlled by the BEA; i.e., connecting the physical storage device to the controlling BEA.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also may be referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication and data exchanges between storage systems (e.g., 20a and 20n), such as between two of the same or different types of storage systems, and/or may be implemented using a director.

The storage system 20a also may include one or more extended data service adapters 29 (EDSs) which are directors configured to serve as EDSs. An EDS may perform various data services, for example, including such services or processing in connection with facilitating other processing performed by BEAs and FAs. For example, an EDS may perform processing that manages metadata tables of information used by other directors such as BEAs in connection with I/O operations, data deduplication, and the like.

The storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs (command line interfaces), APIs (application programming interfaces), and the like, to enable management. In some embodiments, the management module, or portions thereof, may be located external to storage system 20a, for example, as part of one of host systems 14a-n or another separate system connected to the storage system 20a via the network 18.

The FAs, BEAs, EDSs and RAs may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

The system 20a also may include an internal switching fabric (i.e., internal fabric) 30, which may include one or more switches, that enables internal communications between components of the storage system 20a, for example, the directors 37a-n (FAs 21a-n, BEAs 23a-n, EDSs 29, RA 40, management module 22) and the memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs, EDSs, or BEAs) may perform data operations using a cache 28 that may be included in the GM 25b, for example, in communications with other directors, and other components of the system 20a. The other portion 25a is that portion of memory that may be used in connection with other designations that may vary in accordance with each embodiment. The GM 25b and the cache 28 are described in more detail elsewhere herein. It should be appreciated that, although the memory 26 is illustrated in FIG. 1 as being a single, discrete component of storage system 20a, the techniques herein are not so limited. In some embodiments, memory 26, or the GM 25b or the other memory 25a thereof, may be distributed among a plurality of circuit boards (i.e., "boards"), as described in more detail elsewhere herein.

In at least one embodiment, write data received at the storage system from a host or other client may be initially written to the cache 28 and marked as write pending (WP). For example, the cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to the cache 28, the host (e.g., one of 14a-n) may be notified that the write operation has completed. At a later time, the write data may be de-staged from the cache 28 to one or more physical storage devices 24a-n, such as by a BEA.

When the data storage system receives a read I/O operation from the host, the data storage system may determine whether the requested read data needed to service the read I/O operation is in the cache 28. If so, processing determines a read cache hit has occurred whereby the requested read data is retrieved from the cache and returned to the host. If the requested read data is not in the cache, processing determines that a read cache miss has occurred. Responsive to the read cache miss occurring, the requested read data is retrieved from the BE PDs providing the non-volatile BE storage and stored in the cache. Subsequently, the read data (now stored in the cache) is read from the cache and returned to the requesting host.

It should be noted that, although examples of techniques herein may be made with respect to a physical storage system and its physical components (e.g., physical hardware for each RA, EDS, BEA, FA and the like), the techniques herein may be performed in a physical storage system including one or more emulated or virtualized components (e.g., emulated or virtualized ports, emulated or virtualized EDSs, BEAs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

The storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Any of the storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

The host systems 14a-n may provide data and control (e.g., management and access control) information to the storage systems 20a-n over a plurality of I/O paths defined between the host systems and the storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly. Rather access to data may be provided to one or more host systems from what the host systems view as a plurality of logical storage units (LSUs) including, for example, a logical volume, logical block, LUN (i.e., logical device or logical disk), thin or virtually provisioned device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEAs may be used in connection with facilitating communications to the associated physical storage device(s) based on LSU(s) mapped thereto.

Figure 2A:
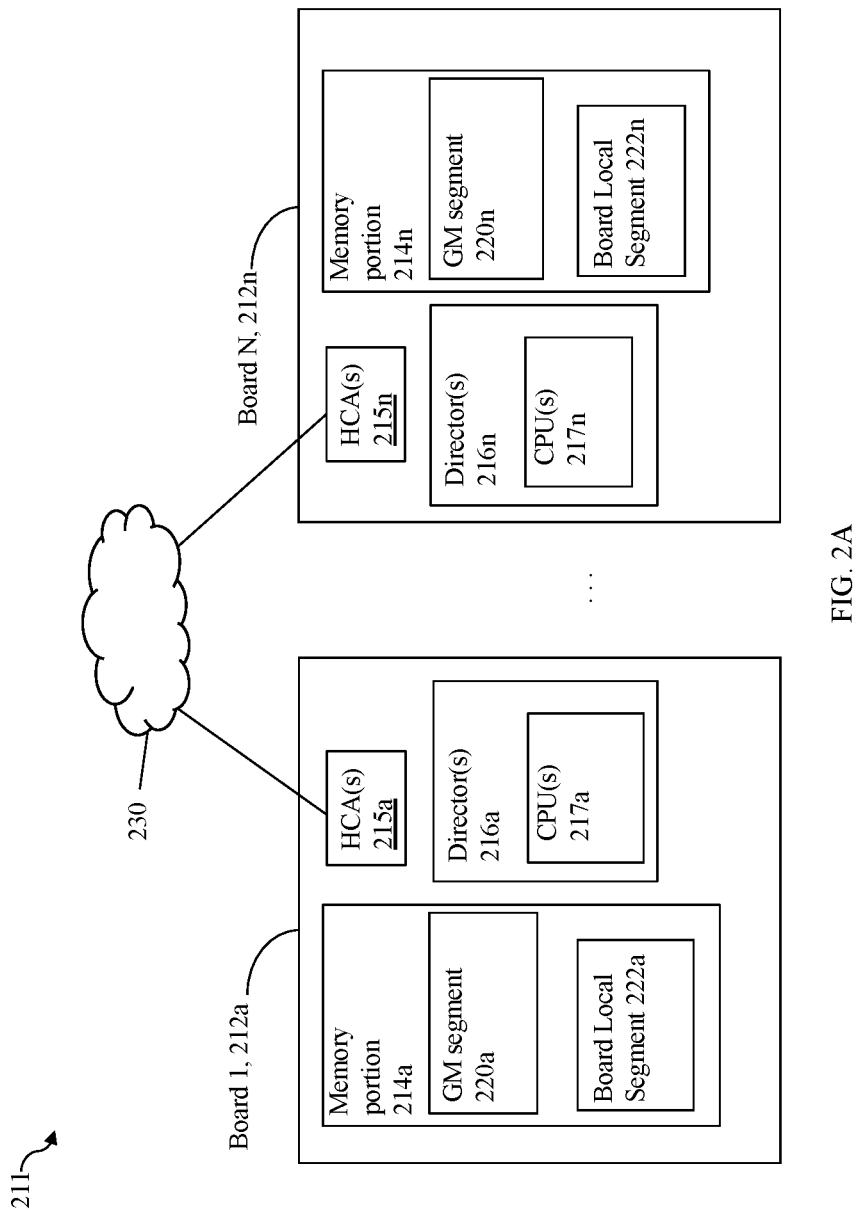
FIG. 2A is a block diagram illustrating an example of a storage system including multiple circuit boards in an embodiment in accordance with the techniques herein.

FIG. 2A is a block diagram illustrating an example of at least a portion 211 of a storage system (e.g., 20a) including multiple boards 212a-212n. The storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, the board 212a may include one or more directors 216a (e.g., directors 37a-n) and memory portion 214a. The one or more directors 216a may include one or more CPUs 217a including compute resources, for example, one or more cores or processing units and/or a CPU complex for processing I/O operations. One or more of the CPUs may be configured to function as one of the directors 37a-n described herein. For example, element 216a of board 212a may be configured to operate, such as by executing code, as any one or more of an FA, BEA, RA, and the like. In at least one embodiment, each of the directors may include a multicore CPU.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, the board 212a includes the memory portion 214a which is memory that is local to that particular the board 212a. Data stored in the memory portion 214a may be directly accessed by a CPU or core of a director 216a of the board 212a. For example, the memory portion 214a may be a fast memory (e.g., DIMM (dual inline memory module) DRAM (dynamic random access memory)) that is locally accessible by a director 216a where data from one location in 214a may be copied to another location in 214a directly using DMA (direct memory access) operations (e.g., local memory copy operations) issued by the director 216a. Thus, the director 216a may directly access data of 214a locally without communicating over the fabric 230.

The memory portions 214a-214n of the boards 212a-n may be further partitioned into different portions or segments for different uses. For example, each of the memory portions 214a-214n may respectively include the GM segments 220a-n configured for collective use as segments of a distributed GM. Thus, data stored in any GM segment 220a-n may be accessed by any director 216a-n on any board 212a-n. Additionally, each of the memory portions 214a-n may respectively include the board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, the GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, the board local segment 222a may be a segment of the memory portion 214a on the board 212a configured for board-local use solely by components on the single/same board 212a. For example, the board local segment 222a may include data which is used and accessed only by the directors 216a included on the same board 212a as the board local segment 222a. In at least one embodiment in accordance with the techniques herein, each of the board local segments 222a-n may include a local page table or page directory used, respectively, by only director(s) 216a-n local to each of the boards 212a-n.

In such an embodiment as in FIG. 2A, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 2B:
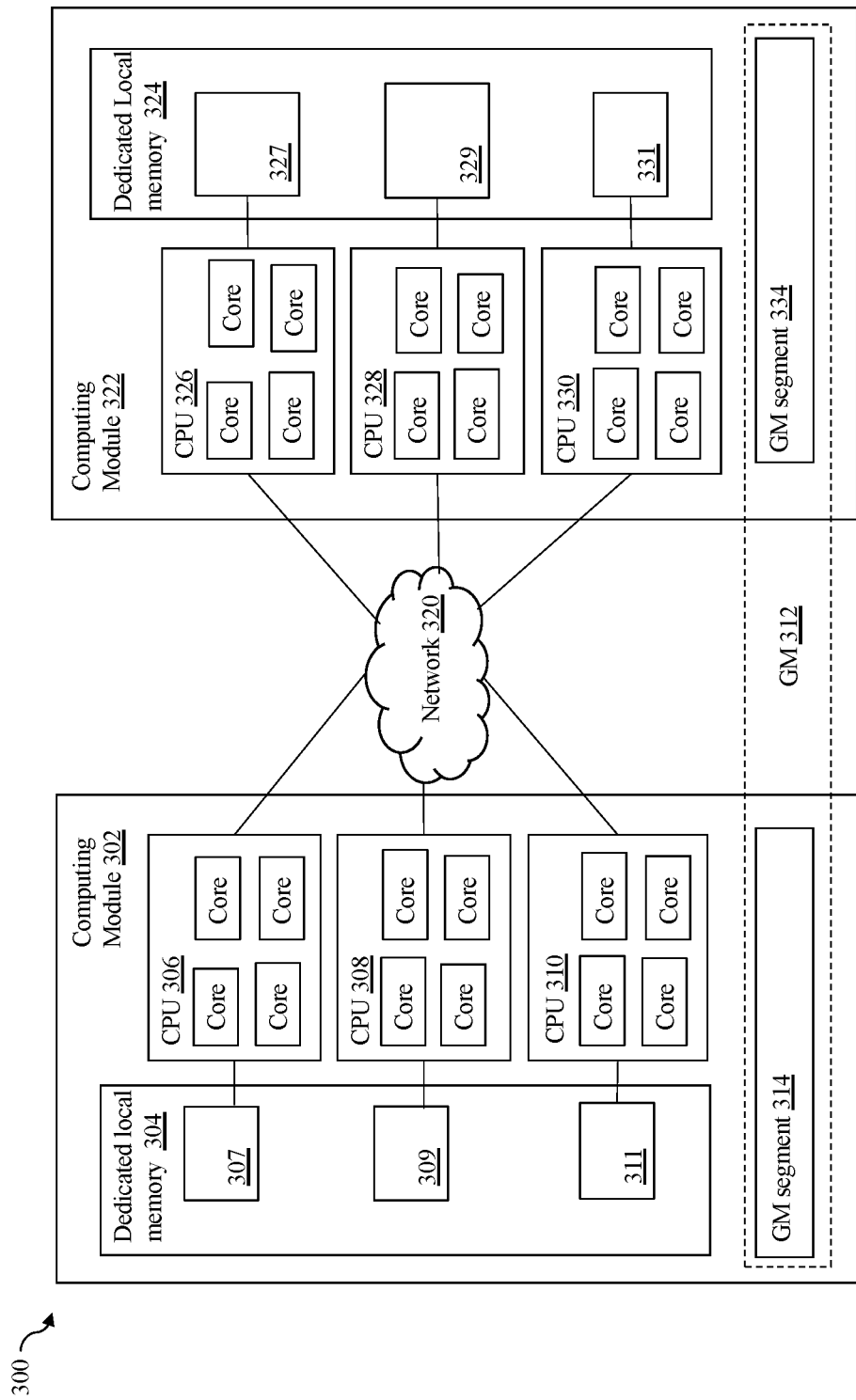
FIG. 2B is a block diagram illustrating an example of a storage system including multiple computing modules and processing cores in an embodiment in accordance with the techniques herein.

FIG. 2B is a block diagram illustrating an example of a storage system 300 including multiple computing modules and CPUs in an embodiment in accordance with the techniques herein. Other embodiments of a storage system including multiple computing modules and CPUs, for example, variations of the storage system 300, are possible and are intended to fall within the scope of embodiments of the techniques herein. The storage system 300 may be a variation of the storage system 211 and may include any of the functionality and/or component described above in relation to storage systems 211 and/or 20a.

Figure 3:
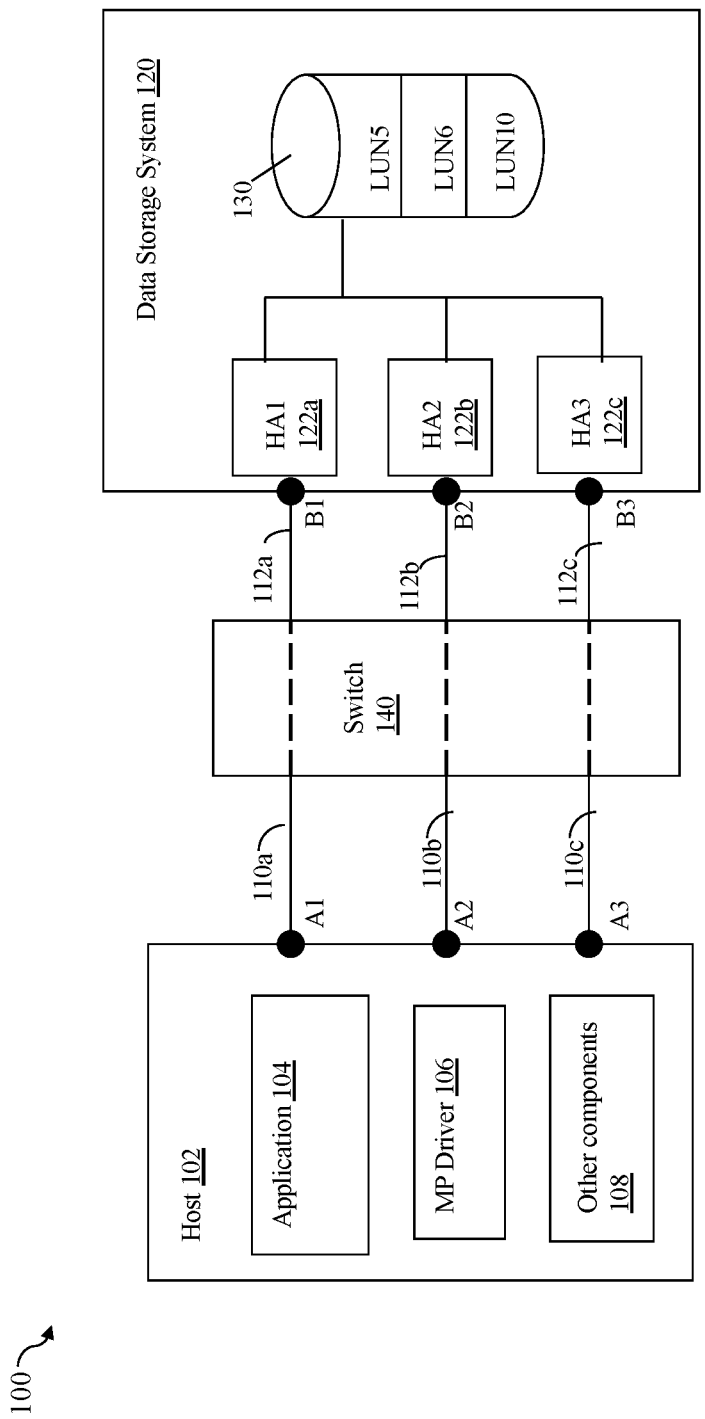

The storage system 300 may include multiple computing modules, including computing modules 302 and 322. It should be appreciated that the storage system may include more than two computing modules. Each of computing modules 302 and 322 may be a director board of a PowerMax system made available from Dell EMC. Each of the computing modules 302 and 322 may include generally one or more CPUs, where each CPU may be a single core or multi-core CPU. For example, the computing module 302 may include the CPUs 306, 308 and 310; and the computing module 322 may include the CPUs 326, 328 and 330. Each CPU may generally include one or more processing units or cores, each of which may be capable of processing a separate instruction stream. As a variation and as illustrated in the embodiment of FIG. 2B, for example, each CPU may include a plurality of processing cores, including a number other than four as illustrated in FIG. 3. In at least one embodiment, each of the CPUs 306, 308, 310, 326, 328 and 330 may be configured (e.g., hardwired, hardcoded or programmed) as a functional component or director of a storage system, for example, an FA, BEA or EDS. More generally, one or more of the CPUs 306, 308, 310, 326, 328 and 330 may be configured (e.g., hardwired, hardcoded or programmed) as a functional component of a storage system, for example, an FA, BEA or EDS.

Each of the computing modules 302, 322 may include, respectively, dedicated local memory 304, 324 dedicated to the computing module. Each of the dedicated local memories 304, 324 may be an implementation of a board local segment, such as the board local segment 222a described in relation to the storage system 211 of FIG. 2A. Further each of the CPUs 306, 308 and 310 may be allocated a portion of the local memory 304 for exclusive or private use by the single CPU. For example, the memory portions 307, 309 and 311 may be configured for exclusive or private use, respectively, by the CPUs 306, 308 and 310; and the memory portions 327, 329 and 331 may be configured for exclusive or private use, respectively, by the CPUs 326, 328 and 330.

In at least one embodiment in accordance with the techniques herein, some or all of a local memory portion designated for exclusive private use by a single CPU may be used as a local cache by the CPU. For example, the memory portion 307 may denote a portion of the dedicated local memory 304 designated as a local or private cache of the CPU 306, the memory portion 309 may denote a portion of the dedicated local memory 304 designated as a local or private cache of the CPU 308, and the memory portion 311 may denote a portion of the dedicated local memory 304 designated as a local or private cache of the CPU 310. Additionally, the memory portion 327 may denote a portion of the dedicated local memory 324 designated as a local or private cache of the CPU 326, the memory portion 329 may denote a portion of the dedicated local memory 324 designated as a local or private cache of the CPU 328, and the memory portion 331 may denote a portion of the dedicated local memory 324 designated as a local or private cache of the CPU 330.

The memory portions denoting the CPU local or private caches 307, 309, 311, 327, 329 and 331 may be configured to store values or data items used solely be each associated CPU.

The GM segment 314 may be a shared portion of a distributed GM 312. Distributed GM 312 may include a GM segment 334 of a computing module 322. The computing module 322 may be connected to the computing module 302 by an internal fabric 320

In at least one embodiment in which each CPU may include multiple processing units or cores and multiple processes may be executing simultaneously on the processing units or cores of the single CPU, processing may be performed to synchronize access to the CPU's local or private resources among the different cores of the single CPU using such resources. For example, in at least one embodiment as described above and illustrated in the FIG. 2B, each CPU may use a local or private cache configured out of the dedicated local memory (e.g., local to a single computing module or board including the processor code). In such an embodiment, any suitable synchronization technique or mechanism may be used to provide exclusive serial access, when needed, to a location or data value in each of the memory portions 307, 309, 311, 327, 329 and 331 used by the multiple cores or processing units in a single CPU. For example, a synchronization technique may be used to synchronize access to locations of the private cache 307 used by the multiple cores of the CPU 306; a synchronization technique may be used to synchronize access to locations of the private cache 309 used by the multiple cores of the CPU 308; and so on, for each of the other multicore CPUs 310, 326, 328 and 330.

As a variation, each CPU 306, 308, 310, 326, 328, 330 may rather be characterized as a processor rather than a multi-core CPU. In this case in which the CPU is rather a single processor or processing unit, there is no contention for locally used resources among multiple cores of the same CPU. In the embodiment in which the CPU is a single core or processing unit, no synchronization technique or mechanism is necessary when accessing, for example, the portions of the private cache of a single CPU. For example, if 306 denotes only a single core or processing unit CPU, then no synchronization technique or mechanism is necessary when accessing, for example, the portions of the private cache or memory 307 used exclusively by the single CPU 306.

Although not explicitly illustrated in FIG. 2B, those CPUs configured as FAs also have the necessary front end interfaces to the network, such as the network 18 of FIG. 1, to communication with external clients such as the hosts. Also, although not explicitly illustrated in FIG. 2B, those CPUs configured as BEAs also have the necessary backend interfaces, such as interfaces to the various backend (BE) non-volatile physical storage devices (PDs) 24 of FIG. 1, to read data from, and write data to, such PDs.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management commands to and/or from a data storage system, and also receiving responses (possibly including requested data) to such control or management commands. For example, with reference to the FIG. 1, the control commands may be issued from data storage management software, such as the management module 22, or from a data storage system management application executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

In the following paragraphs and examples provided for illustration of the techniques herein, reference may be made to a particular LSU, such as a LUN denoting a thin or virtually provisioned logical device. However, more generally, the techniques may be used in connection with any suitable LSU that may be supported and used in an embodiment.

In at least one embodiment, a LUN may be a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN as noted elsewhere herein. With a thin LUN, the physical storage for the LUN may be allocated in blocks or chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

Accordingly, a thin LUN presents a logical storage space to one or more clients, such as applications running on a host, where different portions of the logical storage space may or may not have corresponding physical storage space associated therewith. However, the thin LUN is not mapped directly to physical storage space. Instead, portions of the thin LUN for which physical storage space exists are mapped to data devices, which are logical devices that map logical storage space of the data device to physical storage space on the disk drives or other physical storage devices. Thus, an access of the logical storage space of the thin LUN results in either a null pointer (or equivalent) indicating that no corresponding physical storage space has yet been allocated, or results in a reference to a data device which in turn references the underlying physical storage space.

Thin LUNs and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

Referring to FIG. 3, shown is an example of an embodiment of a system that may be utilized in connection with the techniques herein. The example 100 includes a host 102, a switch 140 and a data storage system 120. The host 102 and the data storage system 120 may communicate over one or more paths through the switch 140. The elements 110a-110c denote connections between the host 102 and the switch 140. The elements 112a-112c denote connections between the data storage system 120 and the switch 140. The element 130 may represent a physical device of the data storage system 120 where the physical device 130 may be configured to include 3 LUNs-LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths.

The MP driver 106 may include functionality to perform any one or more different types of processing such as related to encryption, multipathing, mirroring, migration, and the like. For example, the MP driver 106 may include multipathing functionality for management and use of multiple paths where, for example, the same set of one of more LUNs may be exposed over the multiple paths. For example, when the host needs to send an I/O directed to a LUN to the data storage system, the MP driver 106 may perform path selection to select one of the possible multiple paths over which the LUN is exposed based on one or more criteria such as load balancing to distribute I/O requests for the LUN or target device across available active paths to the LUN or target device. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel (FC), SCSI and/or NVMe drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC, SCSI or NVMe driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g., such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
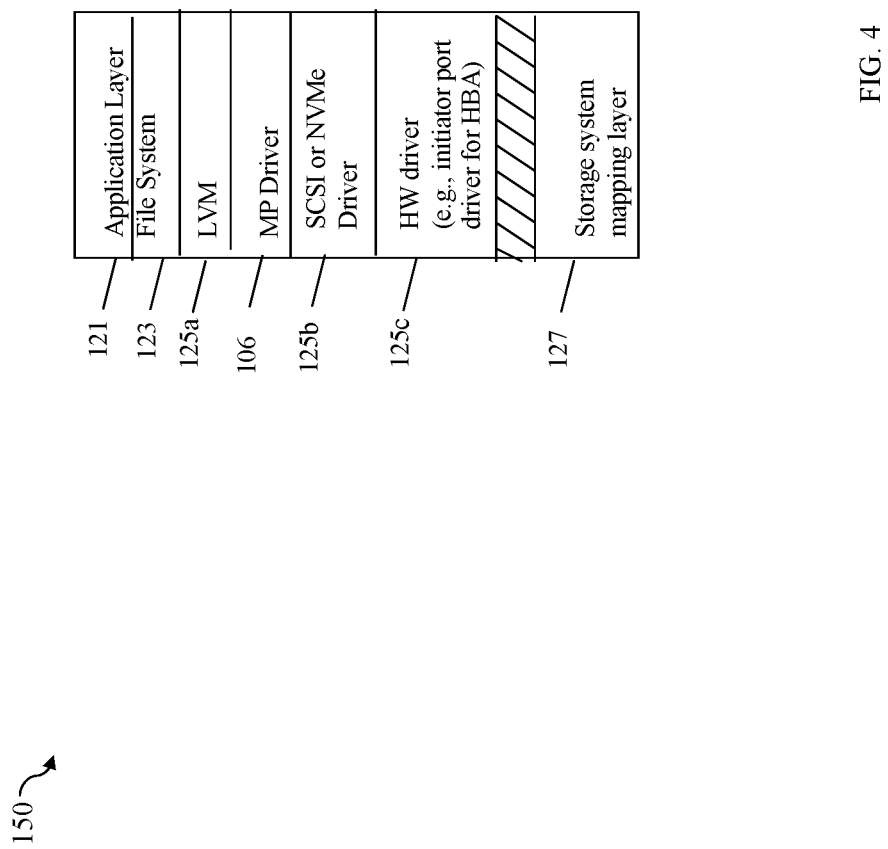
FIG. 4 is an example of a runtime stack associated with the data path or I/O path in an embodiment in accordance with the techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with the techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI or NVMe driver 125b and a hardware (HW) driver 125c. In at least one embodiment the driver 125b may be a SCSI driver that handles processing of a received I/O request from the MP driver 106 such as related to forming a request in accordance with the SCSI standard. As a variation, in at least one embodiment, the driver 125b may be an NVMe driver that handles processing of a received I/O request from the MP driver 106 such as related to forming a request in accordance with the NVMe standard. At least one embodiment in accordance with the techniques herein may operate in accordance with the NVMe protocol as described, for example, in the NVM Express™ Base Specification, Revision 1.4, Jun. 10, 2019, available at nvmexpress.org/wp-content/uploadsNVM-Express-1_4-2019.06.10-Ratified.pdf. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI or NVMe driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator (or more specifically a host intiator port) through the target port of the data storage system.

In connection with some protocols such as SCSI and NVMe, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In connection with the NVMe protocol, communication of I/O operations or other commands may be bidirectional in that either endpoint may act as an initiator and either endpoint may act as a target. In contrast, with other protocols such as the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In existing storage environments, each host is generally connected to the data storage system over multiple paths such as illustrated in the FIG. 3. The multiple paths may be formed between multiple host HBA ports connected to multiple fabric switch ports, where such switch ports are zoned to multiple data storage system ports. As discussed above, a set of one or more LUNs of the data storage system may be exposed to the host over the multiple paths through the multiple target ports of the data storage system. The host may use a MP driver which distributes the I/Os directed to the LUNs over the multiple paths. When a path between the host and the data storage system fails for any reason, the MP driver of the host detects the path failure, stops scheduling I/Os to be sent over the failed path, and continues scheduling I/Os over the remaining available paths between the host and the data storage system. Thus, the I/O workload or load of the remaining available paths is now greater than prior to the path failure since the I/O workload of the failed path is now additional workload sent over the remaining paths. Depending on the path loads prior to the path failure, the remaining available paths may become overloaded since the remaining paths now also handle the additional load of the failed path. During initial system design, the planned path loads need to be such that the remaining surviving paths are able to handle some amount of added I/O load in the event of a path failure. However, over time, the I/O load across the various paths between the host and data storage system may increase and generally vary from the I/O loads considered at the initial design. As such, even though the initial design of the SAN configuration with multiple paths may take into account a path failure, load increases and variations from the initial design may result in one or more target ports of the data storage system being overloaded such as when there is a path failure.

Described in the following paragraphs are techniques that may be used to monitor target port workloads and the statuses of the various paths from the hosts to the data storage systems. The techniques provide for detecting a failed path from a host which may be expected to trigger a target port to be overloaded. In at least one embodiment, the data storage system may monitor the I/O workload of the target ports of the data storage system and may also monitor the statuses of the different paths from the hosts to the data storage system.

Processing may be performed on the data storage system to monitor and track I/O loads or workloads of different elements of a configuration as may be used in connection with the techniques herein. For example, processing may be performed to track the I/O load of each path from a host initiator to a target port of the data storage system, the I/O workload of each target port, the I/O workload of each host initiator, the I/O workload of each LUN, the I/O workload of a particular LUN at a particular target port, the I/O workload of a particular LUN with respect to a particular initiator, and the like. The one or more I/O loads or workloads may be tracked and measured using any suitable metric. For example, the I/O load or workload (sometimes simply referred to herein as load or workload) may be measured as data throughput such as megabytes (MBs) or kilobytes (KBs) per second. More generally, the I/O load or workload may be measured as an amount of data transferred in a given unit of time. As another example, the I/O load or workload may be measured as I/Os per second (IOPS), or more generally I/O throughput denoting a number of I/O requests (e.g., both reads and writes) in a given unit of time. In some embodiments, multiple metrics may be used to determine the total workload of an entity such as a target port, for a particular LUN accessed through a particular target port, for an initiator port, and the like.

In at least one embodiment, each target port may have a specified maximum workload capacity denoting the maximum amount of load the target port is capable of handling. Such maximum workload capacity may denote 100% utilization of the target port. A workload threshold may be specified denoting an upper bound for the observed workload for the target port where it may be desirable, on average over time, to keep the observed workload of a target port below the specified workload threshold. The workload threshold may be an acceptable or desirable upper limit that is less than the specified maximum workload capacity. For example, the workload threshold may be some percentage (e.g. 70%) of the maximum workload capacity. If an expected or observed current percentage denoting the target port load or utilization of a target port is above the workload threshold, then the target port may be characterized as overloaded. It should be noted that in a similar manner, values for maximum workload capacity (=100% utilization), observed workload, and workload threshold may be specified for other components.

The data storage system may perform processing to identify all the initiators that belong to the same host. In at least one embodiment in accordance with the SCSI protocol, host registration may be performed to identify the initiators belonging to the same host. A host registration table be constructed identifying, for each host, all the initiators belonging to that particular host as identified in accordance with host registration performed using host registration commands. For example with reference back to FIG. 3, the host 102 may send a host registration command on each path or unique combination of initiator (e.g., host HBA) and target port. For example, assume that connectivity has been zoned in the switch 140 for paths between each unique pair of initiator and target port or 9 paths zoned between the host and data storage system 120 as follows: A1-B1, A1-B2, A1-B3, A2-B1, A2-B2, A2-B3, A3-B1, A3-B2, and A3-B3. The host 102 (e.g., the MP driver of the host 102) may send a host registration command from the host 102 to the data storage system 120 over each of the foregoing 9 paths to register the host on each of the target ports B1, B2, B3 of the data storage system. In at least one embodiment, the host registration command may be a SCSI command directed to a target port of the data storage system. It should be noted that the host registration command may be directed to a target port of the data storage system rather than a LUN because, at this point in system startup, no LUNs may be defined or have storage provisioned on the data storage system. As an alternative, an embodiment may direct the host registration command issued from a host initiator to a target port to a particular LUN and thereby register that particular path (e.g., initiator and target port) for use with the particular LUN specified in the registration command.

Each registration command sent from an initiator HBA port of the host 102 includes registration information including the HOST NAME uniquely identifying the particular host that sent the registration command. The registration command may also include other information regarding the host, such as the particular host operating system and the like. Additionally, the data storage system 120 receiving the host registration command knows the WWN (world wide unique name) or WWPN (world wide unique port name) of the initiator which sent the registration command. In at least one embodiment, the receiving target port of the data storage system may be provided the WWN or WWPN of the sending host initiator as part of information transmitted with the registration command. An embodiment in accordance with the techniques herein may automatically and programmatically (e.g., by executing code) may determine all registered initiators for host 102 using the registration information transmitted with the host registration commands and knowing the WWNs or WWPNs of the host initiators that sent the host registration commands. More specifically, processing may be performed on the data storage system 120 to process the registration information received with host registration commands to form an initiator group (IG) of all initiators from the same host, the host 102, having the particular HOST NAME.

In at least one embodiment in accordance with the techniques herein, each host may be uniquely identified using an associated HOST NAME. The HOST NAME may be a customer-specified, human-readable name, such as an alphabetic or alphanumeric string providing an easier way for a human to reference or uniquely identify a particular host in a customer system (e.g., such as a customer SAN). However, more generally, the HOST NAME may be any suitable identifier that uniquely identifies and distinguishes the different hosts connected to a data storage system.

As noted above, the data storage system may track the current observed I/O load of each target port of the data storage system. For each target port, the data storage system determines the difference between the target ports currently observed I/O load and the maximum possible target port load. If a first initiator, I1, that belongs to a certain host H1, stops sending I/Os to the data storage system but one or more other initiators of the same host H1 are still sending I/Os to the data storage system, the data storage system determines that the first initiator I1, or one or more paths including the first initiator, has an associated "off" state. The off state generally denotes some condition or state that generally renders I/Os unable to be sent by the initiator to the data storage system. For example, the off state may be due to a hardware failure of the host initiator I1, a hardware failure of a switch port, and the like. Thus, in at least one embodiment, processing may be performed to detect a path failure condition of a path over which I/Os cannot be transmitted. The path failure condition may be due to any one or more conditions such as, for example, a failed host initiator port or HBA, a failed connection, a network or SAN failure such as due to a switch or other component of the SAN failing, and the like. In at least one embodiment, the data storage system may detect a path failure for a particular path from the initiator I1 of the host H1 to the target port T1 of the data storage system. In such an embodiment, the data storage system may determine that the path has failed and has an associated "off" state. If the host H1 does not receive any I/Os from the initiator I1 but does receive I/Os from other initiators of H1, the data storage system may determine that the initiator I1 of the host H1 has failed and has an associated "off" state. For example, if no I/Os are received at the data storage system over the particular path from the initiator I1 of the host H1 to the target port T1 of the data storage system for a defined amount of time, and additionally the data storage system has received I/Os from the host during the time period over other paths from other initiators of the host H1, the data storage system may determine that I1 has failed and has an "off" state.

It should be noted that more generally, an embodiment may determine that a path and a host initiator have failed and have associated off states using any one or more suitable techniques. For example, in at least one embodiment, the data storage system may receive a report or notification from the host regarding the state of particular initiator ports and paths. In such an embodiment, the host may perform processing to detect when any of it's initiator ports have failed and thus have an associated off state. The host may send a notification or report to the data storage system identifying initiator ports and paths that have failed and have an associated off state. The notification or report may be sent in response to any one or more conditions such as: periodically, on demand when requested by the data storage system, in response to the host detecting a change initiator port state, and the like.

In at least one embodiment, the data storage system may use the stopped or failed initiator I1's most recent average I/O workload (i.e., as may be tracked by the data storage system) to determine whether the I/O load of the failed or stopped initiator I1 is expected to overload one or more such data storage system target ports to thereby exceed their maximum I/O capacity or bandwidth, where the I/O load of the failed or stopped initiator I1 will be spread among the data storage system target ports to which the remaining host initiators are connected.

In at least one embodiment, the data storage system may notify a user of the data storage system, such as the data storage system administrator, if such overloading of one or more target ports is expected. In response to receiving the notification, a user may decide to instruct the data storage system to take a corrective action to alleviate or reduce the expected overloading of the one or more target ports. For example, the corrective action may be to throttle down I/Os from that host H1 (through the surviving remaining initiators) to ensure the target ports of the data storage system do not reach overload or overcapacity conditions and thus avoid adversely impacting other hosts.

In at least one embodiment, in response to detecting that one or more target ports are expected to be overloaded, the data storage system may automatically perform one or more actions to alleviate or reduce the expected overload condition of the one or more target ports. For example, the data storage system may automatically throttle down I/Os from the host H1. In this case, the throttling down of I/Os from the remaining initiators of the host H1 may be performed automatically without user input. Any suitable technique may be used to throttle down I/Os from the host H1. For example, the data storage system may introduce an additional artificial time delay D1 when processing I/Os from the host H1 and wait the additional time D1 when returning an acknowledgement to the host H1 regarding completion of the I/Os issued by the host H1. Effectively, the additional time delay for I/Os sent from the host H1 increases the I/O response times for such I/Os.

As another example of an action that may be taken to alleviate or reduce the expected overload condition of the one or more target ports, additional resources of the data storage system may be allocated for use by such target ports in connection with servicing I/Os from the remaining initiators of the host H1. For example, additional cores or CPU resources may be allocated to servicing the I/Os received over such target ports expected to be overloaded. As another example, additional cache may be allocated for use in connection with servicing the I/Os received over such target ports expected to be overloaded (e.g., such cache may be used for storing the read data and write data of, respectively, read I/O operations and write I/O operations received over such target ports expected to be overloaded.

As another example of an action that may be taken to alleviate or reduce the expected overload condition of the one or more target ports, at least a portion of the I/O workload directed to a target port expected to be overloaded may be redirected or diverted to one or more other target ports. Such diversion or redirection may be accomplished using any suitable technique. For example, the switch may be temporarily rezoned to accomplish the desired workload diversion or redirection. In at least one embodiment, dynamic path reconfiguration may be performed to redirect at least some of the I/O workload of a remaining initiator I2 of the host from a target port T1 (expected to be overloaded) to another target port T2 (that is not expected to be overloaded by the additional I/O workload of the initiator I2). The dynamic path reconfiguration may include the data storage system notifying the host, for example, to send all I/Os from I2 to T2 rather than T1, or alternatively to send I/Os directed to one or more specified LUNs from I2 to T2 rather than T1.

Generally, an embodiment may perform any one or more corrective actions in response to determining a target port of the data storage system is expected to be overloaded due to a host initiator or path failure. The correction action may be selected, for example, by a user notified of the expected overload condition of a target port. In some embodiments, the corrective action may be taken automatically in response to determining the target port of the data storage system is expected to be overloaded due to the host initiator or path failure. In at least one embodiment, a user may configure whether a corrective action is taken automatically or alternatively requires user confirmation. In an embodiment in which the corrective action is taken automatically, the user may select the particular corrective action to be taken from multiple actions, where the user selection may be specified beforehand and may be included in a configuration file.

The foregoing and other aspects of the techniques herein are described in more detail in the following paragraphs.

Figure 5:
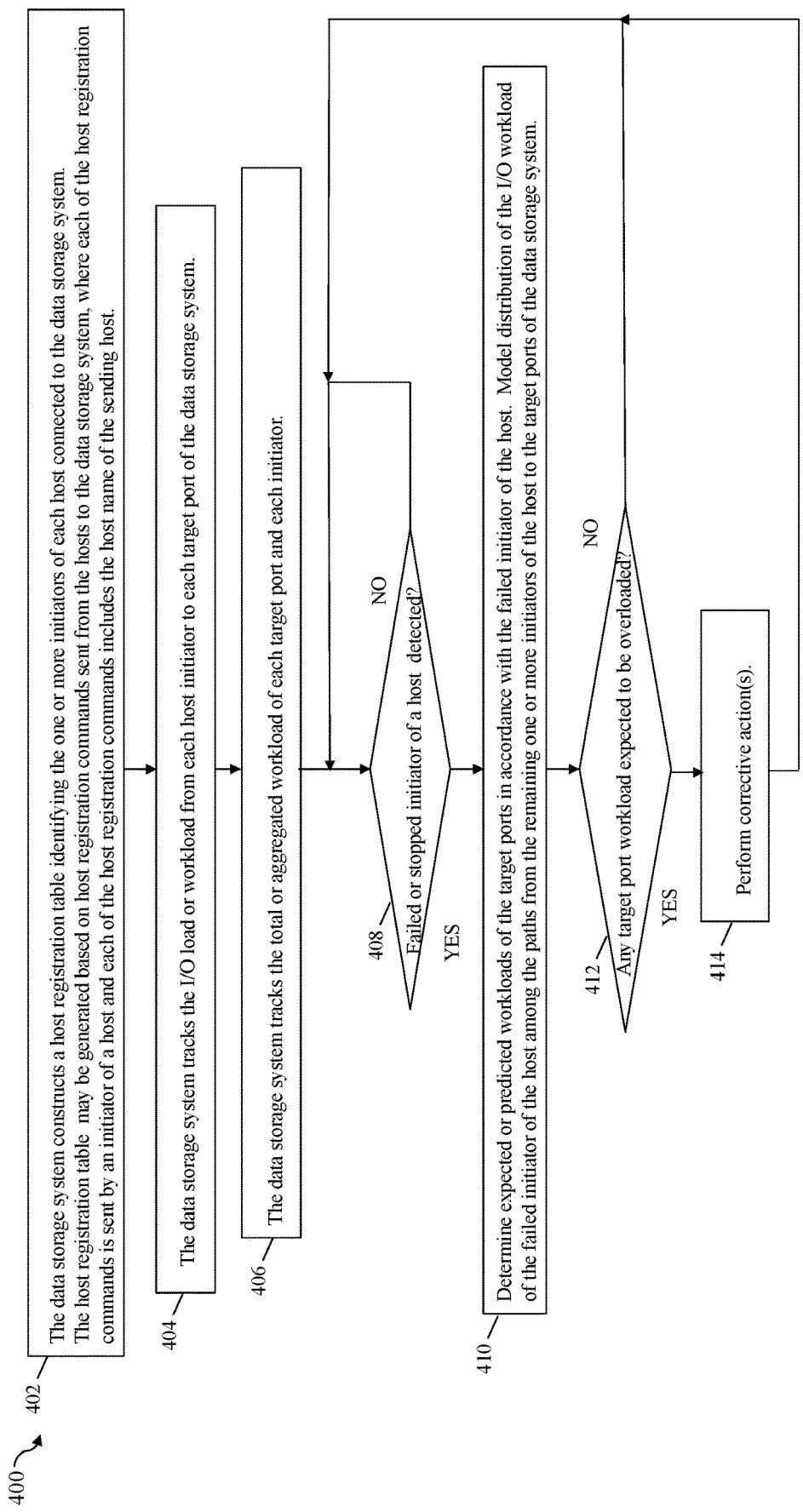
FIG. 5 is a flowchart of processing steps that may be performed in an embodiment in accordance with the techniques herein.

Referring to FIG. 5, shown is a flowchart 400 of processing steps that may be performed in an embodiment in accordance with the techniques herein.

At the step 402, processing may be performed on the data storage system to construct a host registration table identifying the one or more initiators of each host connected to the data storage system. Consistent with other discussion herein, the host registration table may be generated based on host registration commands sent from the hosts to the data storage system, where each of the host registration commands is sent by an initiator of a host and each of the host registration commands includes the host name of the sending host.

In at least one embodiment in accordance with the techniques herein as noted above, host registration may be performed by each host that sends I/Os to LUNs configured on the data storage system. What will now be described in more detail is performing host registration and identifying all registered initiators belonging to the same host using information provided to the data storage system in connection with host registration in at least one embodiment in accordance with the techniques herein.

In an embodiment in accordance with the techniques herein with reference back to FIG. 3, the network and illustrated components may be in the process of initializing and starting up whereby the zoning has completed and the host 102 may be in the process of performing its initialization processing. Once zoning of the switch 140 is complete whereby the host 102 has connectivity defined by such zoning to the data storage system 120, the host 102 (as part of its initialization) may send host registration commands to the data storage system 120. More specifically, the host 102 may send a host registration command on each path or unique combination of initiator (e.g., host HBA) and target port. For example, assume that connectivity has been zoned in the switch 140 for the paths between each unique pair of an initiator and a target port or 9 paths zoned between the host 102 and the data storage system 120 as follows: A1-B1, A1-B2, A1-B3, A2-B1, A2-B2, A2-B3, A3-B1, A3-B2, and A3-B3. The host 102 (i.e., more specifically the MP driver of the host 102) may send a host registration command from the host 102 to the data storage system 120 over each of the foregoing 9 paths to register the host on each of the target ports B1, B2, B3 of the data storage system. In at least one embodiment, the host registration command may be a SCSI command directed to a target port of the data storage system. It should be noted that the host registration command may be directed to a target port of the data storage system rather than a LUN because, at this point in system startup, no LUNs may be defined or have storage provisioned on the data storage system. As an alternative, an embodiment may direct the host registration command issued from a host initiator port to a target port to a particular LUN and thereby register that particular path (e.g., initiator port and target port) for use with the particular LUN specified in the registration command.

In at least one embodiment, each registration command sent from an initiator HBA port of the host 102 includes registration information comprising the HOST NAME uniquely identifying the particular host that sent the registration command. The registration command may also include other information regarding the host, such as the particular host operating system and the like. Additionally, the data storage system 120 receiving the host registration command knows the WWN or WWPN of the initiator which sent the registration command. In at least one embodiment, the receiving target port of the data storage system may be provided the WWN or WWPN of the sending host initiator as part of information transmitted with the registration command. An embodiment in accordance with the techniques herein may automatically and programmatically (e.g., by executing code) may automatically identify all registered initiators from the same host 102 using the registration information transmitted with the host registration commands and knowing the WWNs or WWPNs of the host initiators that sent the host registration commands. More specifically, processing may be performed on the data storage system 120 to process the registration information received with host registration commands to form an initiator group (IG) of one or more initiators for the host 102 having the same HOST NAME. For each host registration command received from a host initiator, where the registration information of the command identifies HOST NAME as the sending host including the initiator, that initiator may be included in the IG for the host 102. In this manner, processing may be performed, such as on the data storage system, to automatically form sets of IGs by grouping and associating initiator WWNs or WWPNs having a common or the same HOST NAME. For example, as noted above with reference back to FIG. 3, 9 host registration commands may sent from the host 102 to the data storage system 120. The IG for the host 102 may include A1, A2 and A3 since each of these initiators sent 3 host registration commands to each of the 3 target ports B1, B2 and B3, and registration information of such commands identified the same HOST NAME (uniquely identifying host 102) as the particular host including the initiators that sent the registration commands.

In at least one embodiment, the data storage system may generate and maintain a host registration table based on the HOST NAMEs and initiators associated with the host registration commands received at the data storage system. The host registration table includes, for each registered host, the unique HOST NAME of each registered host and the registered host's associated initiators (e.g., WWNs or WWPNs of initiators for the particular HOST NAME).

Referring to FIG. 6, shown is an example 200 of a host registration table that may be generated and used in an embodiment in accordance with the techniques herein. The host registration table of FIG. 6 may be generated in connection with processing of the step 402 of FIG. 5.

The host registration table 200 includes a row of information for each unique HOST NAME in connection with host registration commands received at the data storage system. The table 200 includes the following columns: host name 202 and initiators 204. The initiators 204 may include WWNs or WWPNs of the host initiators that sent host registration commands. To further illustrate, the row 206a indicates that the initiators I1 and I2 (column 204) are included in a first host named HOST1 (column 206), whereby the data storage system previously received host registration commands identifying the sending host name as "HOST1" from the initiators I1 and I2. The row 206b indicates that the initiators I3, I4 and I5 (column 204) are included in a second host named HOST2 (column 206), whereby the data storage system previously received host registration commands identifying the sending host name as "HOST2" from the initiators I3, I4 and I5.

Returning to FIG. 5, after performing the step 402, control proceeds to the step 404. At the step 404, processing may be performed on the data storage system to track the I/O load or workload on a per path basis for each path between a host initiator and a target port of the data storage system. The workload tracking of the step 404 may be performed on a continuous basis and may periodically update one or more collected I/O workload metrics regarding each path between a host and the data storage system. From the step 404, control proceeds to the step 406.

At the step 406, processing may be performed on the data storage system to track the total or aggregated I/O load or workload of each target port and also track the total or aggregated I/O load or workload of each initiator. For example, with reference back to FIG. 3, there are 9 paths as described elsewhere. The step 406 processing may determine an aggregated or total workload of the target port B1 based on the combined workloads of the paths A1-B1, A2-B1 and A3-B1 for all LUNs 5, 6, and 10. The step 406 processing may determine an aggregated or total workload of the initiator A1 based on the I/Os directed to the LUNs 5, 6, and 10 where such I/Os are sent by the initiator A1 to the data storage system over any of the 3 paths from A1 to the 3 target ports B1-B3 of the data storage system 120 (e.g., the 3 paths are A1-B1, A1-B2 and A1-B3). The workload tracking of the step 406 may be performed on a continuous basis and may periodically update one or more collected I/O workload metrics for the target ports and initiators. For each target port, the step 406 may include tracking how far the current load from a threshold level denoting a specified maximum target port load. For example, as discussed elsewhere herein, the step 406 may include tracking a percentage or utilization for each target port. From the step 406, control proceeds to the step 408.

At the step 408, processing is performed to determined whether a failed or stopped initiator of a host is detected. As discussed above, in at least one embodiment, the data storage system may use the information in the host registration table to determine whether a particular initiator, such as A1, of a host, such as the host 102 of FIG. 3, is failed or stopped. The current configuration may include a set of one or more paths from the initiator to the data storage system. The step 408 may include the data storage system detecting that, for at least a specified time period, no I/Os have been received at the data storage system on the one or more paths from the initiator to the data storage system. However, the data storage system also detects, during the same time period, that I/Os have been received at the data storage system from other initiators of the same host. To further illustrate, reference is made back to FIG. 3. The data storage system 120 may detect that no I/Os have been received at any of the target ports B1-B3 from the initiator A1. However, the data storage system 120 may also detect that I/Os have been received at the data storage system 120 from one or more of the remaining initiators A2 and A3 of the host 102. Based on the foregoing, the data storage system may determine that there is a failure of the initiator A1, or some component(s) on the paths from A1 to the data storage system, where the initiator A1 has a failed or stopped status as discussed elsewhere herein.

It should be noted that more generally in connection with the step 408 processing, an embodiment may determine that a path and a host initiator have failed and have associated off states using any one or more suitable techniques. For example, in at least one embodiment, the data storage system may receive a report or notification from the host regarding the state of particular initiator ports and paths. In such an embodiment, the host may perform processing to detect when any of it's initiator ports have failed and thus have an associated off state. The host may send a notification or report to the data storage system identifying initiator ports and paths that have failed and have an associated off state. The notification or report may be sent in response to any one or more conditions such as: periodically, on demand when requested by the data storage system, in response to the host detecting a change initiator port state, and the like. Control remains at the step 408 until the step 408 evaluates to yes.

Responsive to the step 408 evaluating to yes, control proceeds to the step 410. At the step 410, processing may be performed on the data storage system to determine expected or predicted workloads of the target ports in accordance with the failed initiator A1 of the host. The step 410 may include modelling distribution of the I/O workload of the failed initiator A1 of the host among the paths from the remaining one or more initiators, such as A2 and A3, of the host to the target ports of the data storage system. The step 410 may use the last or most recently collected I/O workload information, W1, of the failed initiator A1 (as collected in the step 406). The step 410 may model redistribution of W1, the failed initiator A1's workload, among the remaining paths from the remaining initiators A2 and A3 to the target ports B1, B2 and B3. Such redistribution modeling is based on the assumption or prediction that the host will route all subsequent I/Os over the remaining paths. In connection with the example of FIG. 3, there are 6 remaining paths from the initiators A2 and A3 to the target ports B1, B2 and B3.

The modeling may further partition the workload W1 equally among the 6 paths based on the particular load balancing algorithm of the MP driver 106. In this example, the MP driver 106 uses a load balancing algorithm that equally distributes I/Os among the active working path where the modeling may assume that each of the remaining paths will have an additional workload that is one sixth of W1 (e.g., W1/6). If the MP driver 106 uses a different load balancing technique or algorithm, then the modeling may reflect the different technique or algorithm used in an embodiment. The step 410 may include determining a modeled or expected I/O workload of each of the target ports of the data storage system to account for the additional workload of W1/6. The expected I/O workload of each target port may be based on the most recently collected I/O workload information for the target port and the modeled additional workload (e.g., W1/6) from the failed initiator A1. From the step 410, control proceeds to the step 412.

At the step 412, a determination is made as to whether the expected I/O workload of any target port is expected to be overloaded. In at least one embodiment, the condition of target port overload may be determined by comparing the predicted or expected I/O workload of a target port to a threshold, where if the predicted or expected I/O workload of the target port exceeds the threshold, then the target port is predicted or expected to be subsequently overloaded due to the detected failure of the stopped initiator A1. If the step 412 evaluates to no, then no target port is predicted or expected to be overloaded and control proceeds to the step 408. Otherwise, if the step 412 evaluates to yes, at least one target port is expected or predicted to be overloaded and control proceeds to the step 414.

At the step 414, one or more corrective actions may be performed to alleviate or remove the one or more overloaded target port workloads expected. One or more corrective actions that may be taken in the step 414 in an embodiment in an embodiment in mentioned above. Consistent with other discussion herein, a user may be notified regarding the predicted overload of a target port detected in the step 412 and select a particular action to be performed. As a variation, the data storage system may automatically perform a pre-selected or default action responsive to the step 412 evaluating to yes without requiring further user interaction.

For example, with reference to FIG. 3 with a failed initiator A1, the corrective action may be to throttle down I/Os from that host 102 by throttling down subsequent I/Os sent from the surviving remaining initiators A2 and A3 to ensure the target ports of the data storage system do not reach overload or overcapacity conditions and thus avoid adversely impacting other hosts.

In at least one embodiment, in response to detecting that one or more target ports are expected to be overloaded in the step 412, the data storage system may automatically perform one or more actions to alleviate or reduce the expected overload condition of the one or more target ports. For example, the data storage system may automatically throttle down I/Os from the host. In this case, the throttling down of I/Os from the remaining initiators of the host may be performed automatically without user input. Any suitable technique may be used to throttle down I/Os from the host. For example, the data storage system may introduce an additional artificial time delay D1 when processing I/Os from the host and wait the additional time D1 when returning an acknowledgement to the host regarding completion of the I/Os issued by the host.

As another example of an action in the step 414 that may be taken to alleviate or reduce the expected overload condition of the one or more target ports, additional resources of the data storage system may be allocated for use by such target ports in connection with servicing I/Os from the remaining initiators of the host 102. For example, additional cores or CPU resources may be allocated to servicing the I/Os received over such target ports expected to be overloaded. As another example, additional cache may be allocated for use in connection with servicing the I/Os received over such target ports expected to be overloaded (e.g., such cache may be used for storing the read data and write data of, respectively, read I/O operations and write I/O operations received over such target ports expected to be overloaded. In at least one embodiment in which additional resources are dynamically and temporarily allocated to the target port expected to be overloaded, the data storage system may have maximum limits on the resources so allocated in order to avoid adversely affecting other processing in the data storage system. For example, overallocating resources such as additional cores or threads for servicing I/Os at a first target port may adversely affect the ability of other target ports to service I/Os. In at least one embodiment, the different components such as the FAs and DAs described herein may be emulated and run in as virtualized components within the context of virtual machines executing on the data storage system. Allocating more resources for such an emulated FA servicing I/Os of a target port may mean dynamically increasing the number of threads or cores available to service I/Os received for a time period and then subsequently reducing the number of threads or cores such as, for example, after the failed initiator and failed paths are again functional for sending I/Os to the data storage system.

As another example of an action that may be taken in the step 414 to alleviate or reduce the expected overload condition of the one or more target ports, at least a portion of the I/O workload directed to a target port expected to be overloaded may be redirected or diverted to one or more other target ports. Such diversion or redirection may be accomplished using any suitable technique. For example, the switch may be temporarily rezoned to accomplish the desired workload diversion or redirection. In at least one embodiment, dynamic path reconfiguration may be performed to redirect or redistribute at least some of the I/O workload from a first target port expected to be overloaded to another different target port. From the step 414, control proceeds to the step 408.

What will now be described with reference to FIGS. 7A and 7B in more detail is one way in which workload may be redirected or redistributed by dynamic path state modification in at least one embodiment in accordance with the techniques herein. The dynamic path modifications may be made as an action performed in connection with the step 414 to alleviate or reduce the workload of a target port expected to be overloaded due to the detected failed or stopped initiator.

In an embodiment described herein, the data storage system may be a SCSI-based system such as SCSI-based data storage array. An embodiment in accordance with the techniques herein may include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states may be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN).

With the ALUA standard, a recognized path (i.e., recognized by a host as a result of discovery processing) over which I/Os (e.g., read and write I/Os) may be issued to access data of a LUN may have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a preferred path state for the particular LUN. A path for a particular LUN having the active-non optimized (or unoptimized) path state may also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host may proceed to use a path having an active-unoptimized state for the LUN only if there is no active-optimized path for the LUN. A recognized path over which I/Os may not be issued to access data of a LUN may have an "unavailable" state. When a path to a LUN is in the unavailable state, a limited set of non-I/O-based commands (e.g., other than read and write commands to, respectively, read and write user data), such as the SCSI INQUIRY, may be issued. It should be noted that such limited set of non I/O based commands may also be issued over an active (e.g., active optimized and active non-optimized) path as well.

Following is a more detailed example applying use of the techniques herein using dynamic path state configuration in an embodiment operating in accordance with the ALUA standard in connection with performing an action to shift the I/O workload of a data storage system target port expected to be overloaded.

Figure 7A:
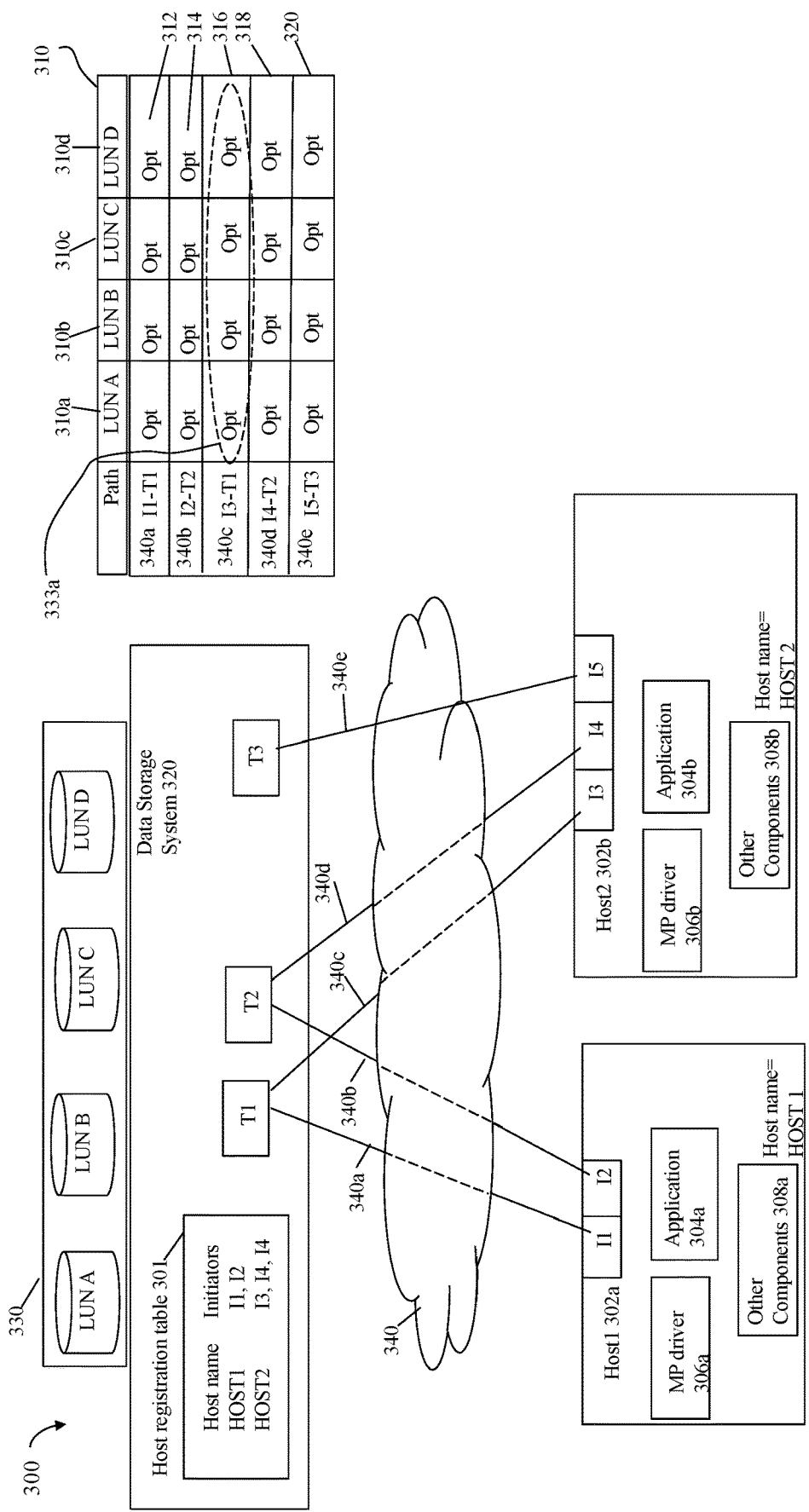
FIGS. 7A and 7B are examples illustrating dynamic path state modification in connection with performing a corrective action to alleviate or reduce an expected target port overload condition in at least one embodiment in accordance with the techniques herein.

Referring to FIG. 7A, shown is an example of an embodiment of a system that may be utilized in connection with the techniques herein. The example 300 includes the hosts 302a-b, a network 340 and a data storage system 320. The host 302a and the data storage system 320 may communicate over the paths 340a-b through the network 340. The host 302b and the data storage system 320 may communicate over the paths 340c-e through the network 340.

The paths 340a-e are described in more detail below. The LUNs A, B C and D of the set 330 are configured from non-volatile BE storage PDs of the data storage system 320. The LUNs of the set 330 may be exposed to both host 302a-b over all the paths 340a-e through the target ports T1-T3 of the data storage system 320.

The hosts 302a-b are illustrated as including components similar to the host 102 of FIG. 3 described elsewhere herein. The host 302a may include an application 304a, an MP driver 306a and other components 308a. The other components 308a may include, for example, one or more other device drivers, an operating system, and other code and components of the host. The host 302a includes the initiator ports I1 and I2. An I/O operation from the application 304a may be communicated to the data storage system 320 using the MP driver 306a and one or more other components of the data path or I/O path. The I/O operations issued by the application 304a may be directed to a LUN, such as one of the LUNs of 330 configured to be accessible to the host 302a over multiple physical paths 340a-b. As such, each of the I/O operations may be forwarded from the application 304a to the data storage system 320 over one of the possible multiple paths 340a-b. The host 302a has a HOST NAME of "HOST1".

The host 302b may include an application 304b, an MP driver 306b and other components 308b. The other components 308b may include, for example, one or more other device drivers, an operating system, and other code and components of the host. The host 302b includes the initiator ports I3, I4 and I5. An I/O operation from the application 304b may be communicated to the data storage system 320 using the MP driver 306b and one or more other components of the data path or I/O path. The I/O operations issued by the application 304b may be directed to a LUN, such as one of the LUNs of 330 configured to be accessible to the host 302b over multiple physical paths 340c-e. As such, each of the I/O operations may be forwarded from the application 304b to the data storage system 320 over one of the possible multiple paths 340c-e. The host 302b has a HOST NAME of "HOST2".

The data storage system includes the host registration table 301 that may be constructed by the data storage system 320 as described elsewhere herein using host registration commands issued by the hosts 302a-b to the data storage system 320 over the paths 340a-e.

The path 340a is formed using the endpoints I1 and T1 and may be denoted as I1-T1. The path 340b is formed using the endpoints I2 and T2 and may be denoted as I2-T2. The path 340c is formed using the endpoints I3 and T1 and may be denoted as I3-T1. The path 340d is formed using the endpoints I4 and T2 and may be denoted as I4-T2. The path 340e is formed using the endpoints I5 and T3 and may be denoted as I5-T3.

In this example, all of the LUNs A, B C and D may be accessible or exposed over all the data storage system target ports T1, T2 and T3 over the paths 340a-e. As described in more detail below, all the paths 340*a-e* for the LUNs A-D a may be specified as active-optimized.

The multiple active paths 340*a-b* allow I/Os from the host 302*a* to be routed over the multiple paths 340*a-b* and, more generally, allow the LUNs A, B C and D to be accessed over the multiple paths 340*a-b*. In the event that there is a component failure in one of the active-optimized multiple paths 340*a-b* for a particular LUN, application I/Os from the host 302*a* directed to the particular LUN can be easily routed over other alternate preferred active paths unaffected by the component failure. Additionally, although not illustrated in FIG. 7A, in the event there are no preferred paths available for issuing I/Os to the particular LUN, non-preferred paths for the particular LUN may be used to send the I/Os to the particular LUN. Thus, an embodiment of the MP driver 306*a* may also perform other processing in addition to load balancing in connection with path selection. The MP driver 306*a* may be aware of, and may monitor, all paths between the host 302*a* and the LUNs A, B C and D in order to determine that particular state of such paths with respect to the various LUNs. In this manner, the MP driver 306*a* may determine which of the multiple paths 340*a-b* over which a LUN is visible may be used for issuing I/O operations successfully. Additionally, the MP driver 306*a* may use such information to select one of the paths 340*a-b* for host-data storage system communications issued to the particular LUN.

The multiple active paths 340*c-e* allow I/Os from the host 302*b* to be routed over the multiple paths 340*c-e* and, more generally, allow the LUNs A, B C and D to be accessed over the multiple paths 34-*c-e*. In the event that there is a component failure in one of the active-optimized multiple paths 340*c-e* for a particular LUN, application I/Os from the host 302*b* directed to the particular LUN can be easily routed over other alternate preferred active paths unaffected by the component failure. Additionally, although not illustrated in FIG. 7A, in the event there are no preferred paths available for issuing I/Os to the particular LUN, non-preferred paths for the particular LUN may be used to send the I/Os to the particular LUN. Thus, an embodiment of the MP driver 306*b* may also perform other processing in addition to load balancing in connection with path selection. The MP driver 306*b* may be aware of, and may monitor, all paths between the host 302*b* and the LUNs A, B C and D in order to determine that particular state of such paths with respect to the various LUNs. In this manner, the MP driver 306*b* may determine which of the multiple paths 340*c-e* over which a LUN is visible may be used for issuing I/O operations successfully. Additionally, the MP driver 306*b* may use such information to select one of the paths 340*c-e* for host-data storage system communications issued to the particular LUN.

In the example 300, each of the LUNs A, B C and D may be exposed through the 5 paths 340*a-e*. As described in more detail below, each of the paths 340*a-e* may have an associated ALUA state also used by the host when issuing I/O operations. Each of the paths 340*a-e* may be represented by two path endpoints—a first endpoint on one of the hosts 302*a-b* and a second endpoint on the data storage system 320. The first endpoint may correspond to a port of a host component, such as a host bus adapter (HBA) of one of the hosts 302*a-b*, and the second endpoint may correspond to a target port of a data storage system component, such as a target port of the data storage system 320. In the example 300, the elements I1, I2, I3, I4 and I5 each denote an initiator port of one of the hosts 302*a-b*, and the elements T1, T2 and T3 each denote a target port of the data storage system 320.

In an embodiment described herein, the data storage system 320 may be a SCSI-based system such as SCSI-based data storage array operating in accordance with the ALUA standard. As described herein, a data storage system in accordance with techniques herein may set an access path state for a particular LUN over a particular path from an initiator port of a host to a target port of the data storage system. For example, the data storage system may set an access path state for a particular LUN on a particular path to active-optimized (also referred to herein as simply "optimized" or "preferred") to denote the path as a preferred path for sending I/Os directed to the LUN. The data storage system may set an access path state for a particular LUN on a particular path to active-non optimized (also referred to herein as simply "non-optimized" or "non-preferred") to denote a non-preferred path for sending I/Os directed to the LUN sent. The data storage system may also set the access path state for a particular LUN on a particular path to other suitable access states.

In accordance with the techniques herein, the data storage system may set the path state for a particular LUN to preferred or non-preferred in connection with an action taken in response to an expected overloaded target port of the data storage system. Dynamically modifying the state of one or more paths to a target port may be taken as part of an action responsive to determining an expected overloaded target port due to a detected host initiator or path failure as discussed elsewhere herein. Dynamically modifying the state of one or more paths to the target port may be used to generally load balance or rebalance I/O workload of the LUNs among the paths and target ports of the data storage system. Thus, multipathing software, such as the MP drivers 306*a-b* respectively on the hosts 302*a-b*, may monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system may vary the associated access state of each such path in order to vary and control the particular ones of the multiple paths over which I/Os may be issued to the LUN. Use of such access state changes in connection with the techniques herein is described in more detail below.

In at least one embodiment, target ports are given identifiers and may be organized into target port groups (TPGs). In at least one embodiment, a TPG may be defined as a logical grouping or collection of one or more target port identifiers that share the same access characteristics for a particular LUN. For example, target ports T1, T2 and T3 may be included in the same first TPG. With ALUA in at least one embodiment, a LUN may be visible with respect to the entire TPG rather than on a port level basis. In other words, a LUN may be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g., with respect to all target ports of a TPG). Thus the LUN has the same path state or access characteristic with respect to all target ports of the same TPG. For example, the first TPG noted above may include all target ports T1-T3 over which the LUNs A, B, C and D of the set 330 are exposed.

The table 310 denotes the path states for each of the 5 paths 340*a-e* for the 4 LUNs A, B C and D. The table 310 reflects the path states at a first point in time T11. The row 312 indicates that path I1-T1 340a including the target port T1 is optimized (opt) or preferred for the LUNs A-D. The row 314 indicates that path I1-T2 340b including the target port T2 is optimized (opt) or preferred for the LUNs A-D. The row 316 indicates that path I3-T1 340c including the target port T1 is optimized (opt) or preferred for the LUNs A-D. The row 318 indicates that path I4-T2 340d including the target port T2 is optimized (opt) or preferred for the LUNs A-D. The row 320 indicates that path I5-T3 340e including the target port T3 is optimized (opt) or preferred for the LUNs A-D.

At the first point in time T11, assume that none of the target ports T1-T3 is considered overloaded in that the current I/O workload through each of the target ports T1-T3 is well below MAX, the maximum bandwidth or load capability of each such target port. At the first point in time T11, note also that I/Os are received on the data storage system over all the paths 340a-e.

At a second point in time T12 subsequent to the time T11, the data storage system may determine that the path 340b is stopped or down. For example, the data storage system 320 may not have received any I/Os over the path 340b from the host 302a for a specified period of time. During the specified period of time however the data storage system may have received I/Os from the host 302a over the path 340a and may have received I/Os over the paths 340c-e from the host 302b. As discussed elsewhere herein, since the data storage system has not received I/Os over the path 304b from the host 302a but has received I/Os from the host over the other path 302a, the data storage system may presume that the path 304b, and thus the initiator I2, is failed or otherwise unavailable. In this case, the data storage system 320 may expect the host 302a to subsequently send any I/Os that would have been transmitted over the failed path 340b to now be transmitted over the remaining available path 340a. Thus, the path 340a now has the additional I/O workload of the failed path 340b. In particular, the target port T1 now has the additional I/O workload of the failed path 340b (e.g., from the initiator I2 of the host 302a) since the host 302a will now send all I/Os directed to LUNs A-D over only the path 340a.

The data storage system may determine at the time T12 that the additional I/O workload expected on the target port T1 is expected to overload the target port T1 by exceeding MAX. In response, to detecting the expected overload of the target port T1, a corrective action may be taken to shift I/O workload of one or more LUNs from the target port T1 to another target port of the system 320. Generally, the corrective action may include shifting the I/O workload of one or more LUNs A-D from the overloaded target port T1 to another target port, such as T2 or T3. In this particular example, the host 302a only has a single path 340a to the data storage system 320 due to the failed path 340b. However, the host 302b still has multiple paths 304c-e to multiple target ports T1-T3. In this particular example, assume the data storage system takes a corrective action to reduce the load on target port T1 by shifting all I/O workload from the host 302b off of target port T1 so that target port T1 is only used by the host 302a. The corrective action may be implemented by changing the paths states of 333a with respect to the path I3-T1 340c for all the LUNs A-D from optimized (Opt) or preferred to non-optimized (non-opt) or non-preferred. It should be noted that the corrective action in an embodiment may select to change the path states with respect to the path I3-T1 340c of 333a from optimized to non-optimized for only some of the LUNs A-D rather than all of the LUNs A-D as in this example so long the corrective action results in the expected I/O workload on the target port T1 being sufficiently below MAX.

Figure 7B:
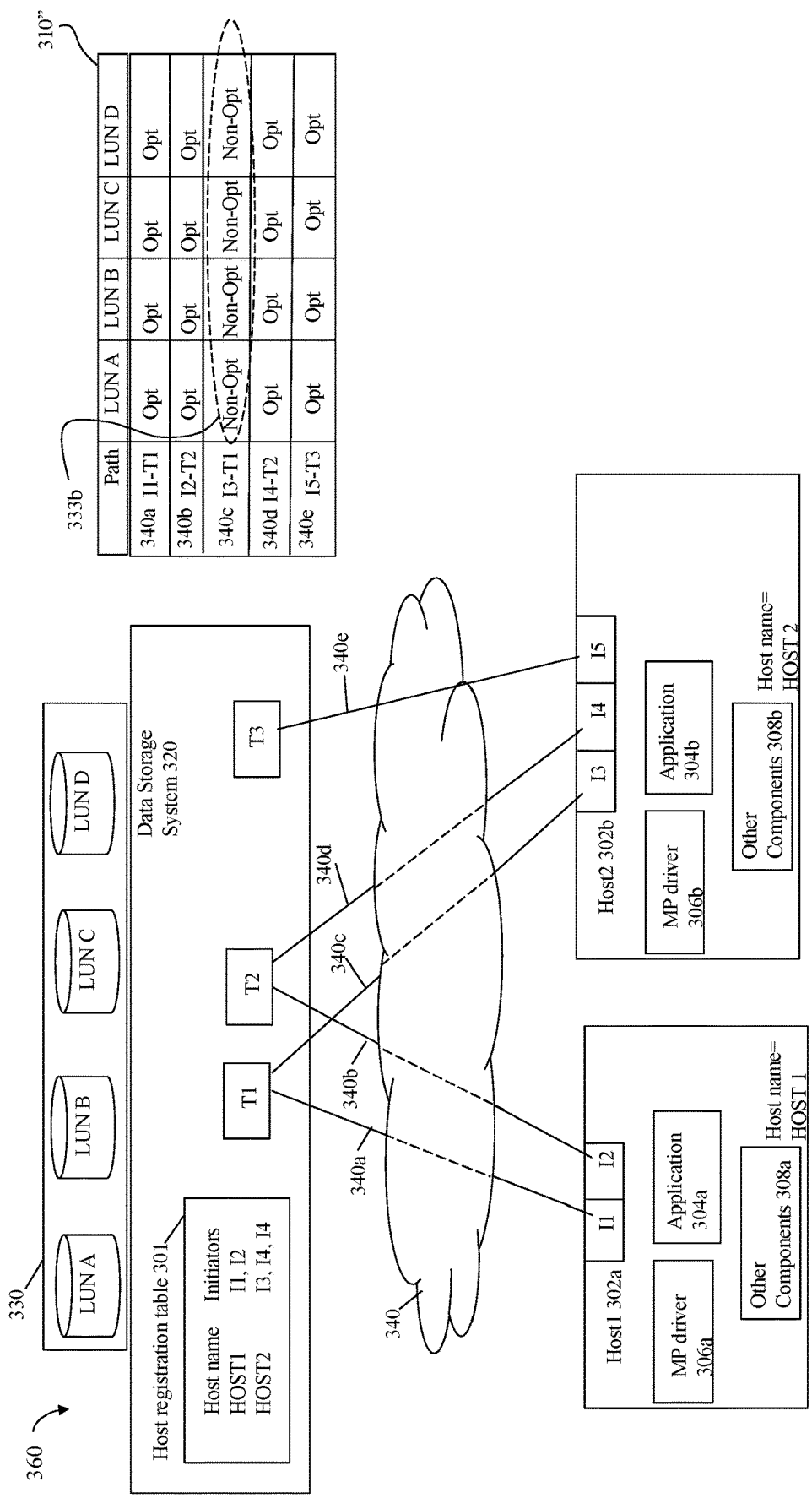

In one aspect, the LUNs of the set 330 having the path I3-T1 340c denoted as an optimized or preferred path may be characterized as candidates from which the one or more LUNs may be selected for having their workload shifted from the target T1. In connection with this particular example, all LUN candidates A-D are selected to have their path state changed from optimized to non-optimized as discussed below. In accordance with the techniques herein, the load rebalancing or shifting from the target port T1 as part of the corrective action processing may include modifying the path states of the row 333a of the table 310 of the table 310 for the LUNs A-D to have resulting values as denoted by the row 333b of the table 310" of the FIG. 7B. The FIG. 7B includes similarly numbered components as in the FIG. 7A with the following difference:

The table 310 of FIG. 7A is updated as a result of the corrective action performed to reduce the load on the target port T1, where the table 310 is modified to have the values as in the table 310" of the FIG. 7B. In particular, the table 310 of FIG. 7A and the table 310" of FIG. 7B differ only in that the element 333a of the FIG. 7A is updated by the corrective action to have the updated values as denoted by the element 333b of the FIG. 7B. The element 333b indicates that the path states for the LUNs A-D on the path I3-T1 340c have been updated as non-preferred or non-optimized (non-opt).

Responsive to the data storage system updating the states of the element 333a of the table 310 of FIG. 7A to have the resulting values as in the element 333b of the table 310" of the FIG. 7B, the data storage system may notify the host 302b regarding the path state changes and the updated path states as illustrated by the element 333b. Based on the information in the element 333b, the MP driver 306b of the host 302b may subsequently send I/Os to the LUNs A-D using the preferred paths 340d-e rather than the non-preferred path 340c. In at least one embodiment, the MP driver 306b of the host 302b may use the information of the received notification identifying the state changes of the element 333b. The host 302b may send I/Os to any of the LUNs A-D over the paths 340d-e identified in the table 310" as preferred or optimized for the LUNs A-D. The host 302b, or more generally any host, may always send I/Os using only the optimized or preferred paths. If there are no active optimized or preferred paths for the LUN, the host may then utilize one of the active non-preferred or non-optimized paths for the LUN. Thus, the path state modifications as illustrated by the element 333b effectively shifts or moves subsequent I/O workload from the host 302b directed to the LUNs A-D from the target port T1 (e.g., away from the path I3-T1 340c) to the target ports T2-T3 (e.g., to the paths I4-T2 340d and I5-T3 340e). In this example, the data storage system may have also performed processing to determine the predicted I/O workload on the target ports T2 and T3 expected after performing the path state modification of the table 310". In particular, the data storage system on this example has determined that the expected I/O workload shift where the I/O workload of the path I3-T1 340c is now added to the two paths 340d-e does not result in an expected I/O workload overload of the target ports T2 and T3.

The data storage system may use any suitable technique to determine the expected predicted total I/O workload of T2 and T3 as a result of shifting the I/O workload of the path 340c to the paths 340d-e. For example, the data storage system may have some knowledge regarding the path selection technique or algorithm implemented by the MP driver 306b of the host 302b. The MP driver 306b may, for example, distribute the future I/O workload of the path 340c as equally as possible among the remaining paths 340d-e. In modeling the expected I/O workload of proposed workload shifts of candidate paths and LUNs, the data storage system may presume that if the I/O workload (prior to implementing the corrective action) of the path 340c has been L1, the I/O workload of the path 340d has been L2, and the I/O workload of the path 340e has been L3, then the resulting predicted workloads of the paths 340c-e after implementing the corrective action may be as follows: the path 340d=L2+(L1/2); the path 340e=L3+(L1/2); and the path 340c workload is now 0. Based on the foregoing, the data storage system may determine that the resulting predicted workloads are not expected to overload the target ports T2 and T3. In selecting and implementing a particular corrective action, processing may include determining that the particular corrective action is not expected to result in overloading any target port of the data storage system. For example, if implementing the corrective action as illustrated by the ALUA dynamic path state change from the table 310 to the table 310'' is expected to overload one of the target ports T2 or T3, other possible workload shifts implemented using alternative ALUA dynamic path state changes may be further evaluated. For example, rather than make the path 340c non-opt for all the LUNs A-D as in the table 310'' (thereby shifting the I/O workload of all the LUNs A-D off of the path 340c), perhaps make the path 340c non-opt for two of the LUNs A-B and leave path state of the path 340c as opt for the LUNs C and D. In this latter case, none of the resulting workloads of the target ports T1, T2 and T3 may be expected to be overloaded (i.e., all resulting target ports workloads are below MAX).

The techniques herein may be performed using any suitable hardware, firmware, software and/or other computer-implemented modules or devices having the described features and performing the described functions. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may be non-transitory and may include different forms of volatile (e.g., RAM) and non-volatile (e.g., ROM, flash memory, magnetic or optical disks, or tape) storage which may be removable or non-removable. Embodiments of the techniques described herein may be used in connection with any appropriate operating system.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of detecting and managing target port overloads comprising:
   receiving, from a host, registration commands sent from a plurality of initiators of the host to a plurality of target ports of a data storage system, wherein each of the registration commands sent from a corresponding one of the plurality of initiators of the host includes a host name uniquely identifying the host which sent said each registration command;
   subsequent to said receiving the registration commands, determining, by the data storage system using the host name for the host included in the registration commands, that the plurality of initiators are included in a same host, the host;
   receiving I/Os from the plurality of initiators of the host at the plurality of target ports of a data storage system;
   determining a plurality of initiator workloads for the plurality of initiators;
   determining a plurality of target workloads for the plurality of target ports;
   determining, by the data storage system, that a first of the plurality initiators of the host is a failed initiator that has stopped sending I/Os to the data storage system, wherein the first initiator has a first initiator workload of the plurality of initiator workloads;
   responsive to the data storage system determining that the first initiator of the host is a failed initiator, determining, by the data storage system in accordance with the first initiator workload, a plurality of revised target workloads for the plurality of target ports;
   determining, in accordance with plurality of revised target workloads, whether any of the plurality of target ports is expected to be overloaded; and
   responsive to determining that at least one of the plurality of target ports is expected to be overloaded, performing at least one corrective action to alleviate or reduce an overloaded workload condition expected for the at least one target port.

2. The method of claim 1, wherein determining the plurality of revised target workloads for the plurality of target ports is performed on the data storage system and includes:
   modeling distribution of the first initiator workload over paths from remaining initiators of the host to the plurality of target ports, wherein the remaining initiators include all initiators of the plurality of initiators other than the first initiator that failed.

3. The method of claim 2, wherein said modeling distribution is performed on the data storage system in accordance with a load balancing algorithm performed by a multipath driver of the host that performs path selection for selecting a path used for sending I/Os from the host to the data storage system.

4. The method of claim 2, wherein the registration commands include a plurality of host registration commands, the method further comprising:
   receiving, at the data storage system from the host, the plurality of host registration commands, wherein each of the plurality of host registration commands is sent on a path from one of the plurality of initiators of the host to one of the plurality of target ports of the data storage system.

5. The method of claim 4, wherein the data storage system generates a host registration table using the plurality of host registration commands.

6. The method of claim 5, wherein the host registration table identifies, for the host, the plurality of initiators of the host.

7. The method of claim 6, wherein said determining that the first initiator of the host is a failed initiator that has stopped sending I/Os to the data storage system comprises:
   determining, using the host registration table, that at least one of the remaining initiators is sending I/Os to the data storage system during a same time that the first initiator has stopped sending I/Os to the data storage system.

8. The method of claim 7, wherein the host is a first host having a first entry in the host registration table, wherein the first entry identifies the plurality of initiators as belonging to the first host.

9. The method of claim 8, further including:
receiving, at the data storage system from a second host, a second plurality of host registration commands, wherein each of the second plurality of host registration commands is sent on a path from one of a second plurality of initiators of the second host to one of the plurality of target ports of the data storage system, wherein each of the second plurality of host registration commands includes a second host name uniquely identifying the second host; and
creating a second entry in the host registration table for the second host, wherein the second entry identifies the second plurality of initiators as belonging to the second host.

10. The method of claim 1, wherein the at least one corrective action includes a first corrective action that introduces an additional delay when servicing I/Os sent from the host to the data storage system.

11. The method of claim 10, wherein it is determined at a first point in time that the at least one of the plurality of target ports is expected to be overloaded, and subsequent to the first point in time, the host sends a first plurality of I/O operations to the data storage system, and wherein the data storage system waits an additional amount of time before returning an acknowledgement to the host regarding completion of each of the first plurality of I/O operations.

12. The method of claim 1, wherein the at least one corrective action includes a first corrective action that allocates additional resources of the data storage system for use by the at least one target port expected to be overloaded, wherein the additional resources are used by the target port in connection with servicing received I/Os.

13. The method of claim 12, wherein the additional resources includes any of: additional cores, additional threads, or additional processor resources.

14. The method of claim 1, wherein the at least one corrective action includes a first corrective action that performs dynamic path state modification that redistributes at least some I/O workload of the at least one target port expected to be overloaded to another one of the plurality of target ports that is not expected to be overloaded.

15. The method of claim 14, wherein a first path is from one of the remaining initiators to a first of the plurality of target ports expected to be overloaded, wherein before performing the first corrective action, the first path is preferred, and wherein performing the first corrective action includes:
modifying a first state of the first path to denote that the first path has transitioned from preferred to non-preferred; and
notifying the host regarding the change in the first state of the first path to non-preferred, wherein the host sends I/Os to the data storage system over one or more other paths having an associated state of preferred and wherein the host does not send I/Os over the first path while the first state is non-preferred unless there are no other active preferred paths between the host and the data storage system.

16. A system comprising:
at least one processor; and
at least one memory comprising code stored thereon that, when executed, performs a method of detecting and managing target port overloads comprising:
receiving, from a host, registration commands sent from a plurality of initiators of the host to a plurality of target ports of a data storage system, wherein each of the registration commands sent from a corresponding one of the plurality of initiators of the host includes a host name uniquely identifying the host which sent said each registration command;
subsequent to said receiving the registration commands, determining, by the data storage system using the host name for the host included in the registration commands, that the plurality of initiators are included in a same host, the host;
receiving I/Os from the plurality of initiators of the host at the plurality of target ports of a data storage system;
determining a plurality of initiator workloads for the plurality of initiators;
determining a plurality of target workloads for the plurality of target ports;
determining, by the data storage system, that a first of the plurality initiators of the host is a failed initiator that has stopped sending I/Os to the data storage system, wherein the first initiator has a first initiator workload of the plurality of initiator workloads;
responsive to the data storage system determining that the first initiator of the host is a failed initiator, determining, by the data storage system in accordance with the first initiator workload, a plurality of revised target workloads for the plurality of target ports;
determining, in accordance with plurality of revised target workloads, whether any of the plurality of target ports is expected to be overloaded; and
responsive to determining that at least one of the plurality of target ports is expected to be overloaded, performing at least one corrective action to alleviate or reduce an overloaded workload condition expected for the at least one target port.

17. A non-transitory computer readable medium comprising code stored thereon that, when executed, performs a method of detecting and managing target port overloads comprising:
receiving, from a host, registration commands sent from a plurality of initiators of the host to a plurality of target ports of a data storage system, wherein each of the registration commands sent from a corresponding one of the plurality of initiators of the host includes a host name uniquely identifying the host which sent said each registration command;
subsequent to said receiving the registration commands, determining, by the data storage system using the host name for the host included in the registration commands, that the plurality of initiators are included in a same host, the host;
receiving I/Os from the plurality of initiators of the host at the plurality of target ports of a data storage system;
determining a plurality of initiator workloads for the plurality of initiators;
determining a plurality of target workloads for the plurality of target ports;
determining, by the data storage system, that a first of the plurality initiators of the host is a failed initiator that has stopped sending I/Os to the data storage system, wherein the first initiator has a first initiator workload of the plurality of initiator workloads;
responsive to the data storage system determining that the first initiator of the host is a failed initiator, determining, by the data storage system in accordance with the first initiator workload, a plurality of revised target workloads for the plurality of target ports;

determining, in accordance with plurality of revised target workloads, whether any of the plurality of target ports is expected to be overloaded; and responsive to determining that at least one of the plurality of target ports is expected to be overloaded, performing at least one corrective action to alleviate or reduce an overloaded workload condition expected for the at least one target port.

\* \* \* \* \*

UNITED STATES PATENT AND TRADEMARK OFFICE
CERTIFICATE OF CORRECTION

| | |
|---|---|
| PATENT NO. | : 11,768,744 B2 |
| APPLICATION NO. | : 17/159329 |
| DATED | : September 26, 2023 |
| INVENTOR(S) | : Krishna Deepak Nuthakki et al. |

It is certified that error appears in the above-identified patent and that said Letters Patent is hereby corrected as shown below:

In the Claims

Column 35, Lines 26 and 27:
In Claim 11, the phrase "plurality of I/O operations"
Should read:
-- plurality of I/Os --

Signed and Sealed this
Thirty-first Day of October, 2023

Katherine Kelly Vidal
*Director of the United States Patent and Trademark Office*